United States Patent Office 3,444,433
Patented May 13, 1969

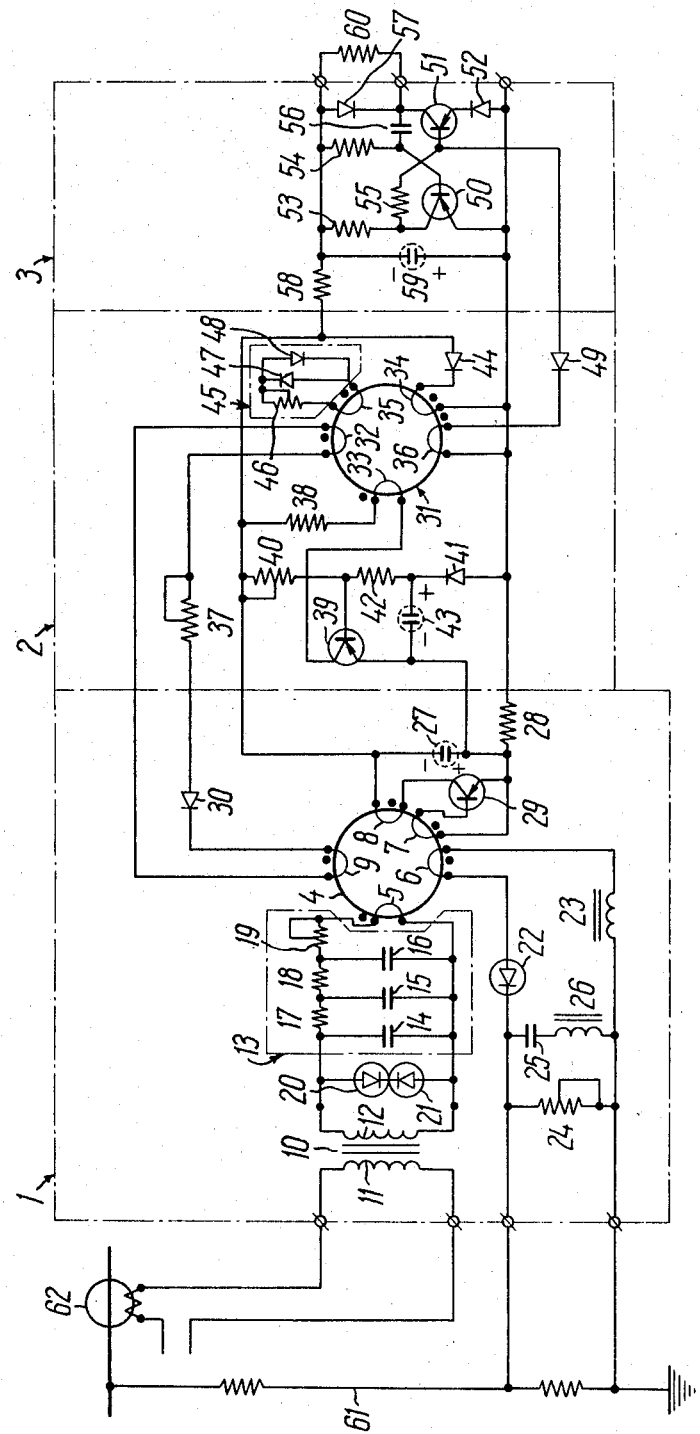

3,444,433
PROTECTIVE DEVICE HIGH-VOLTAGE D.C.
POWER TRANSMISSION LINES
Vasily Makarovich Maranchak, Lefortovsky val 7/6, korp 9, kv. 12; and Stanislav Petrovich Veisky, Marxistskaya ulitsa 43, kv. 10, both of Moscow, U.S.S.R.; and Vladislav Vladimirovich Krivenkov, Oktyabrsky prospekt 60, kv. 36, Moskovskaya Oblast, Ljubertsy, U.S.S.R.
Filed Apr. 5, 1966, Ser. No. 540,387
Int. Cl. H02h 1/04
U.S. Cl. 317—36            5 Claims

ABSTRACT OF THE DISCLOSURE

A protective device for high-voltage D.C. power transmission lines having a discriminating member including a transformer having primary and secondary windings, the latter being connected to a primary winding of a rectangular hysteresis loop core, the other of which is connected to a voltage divider of the line being protected. The loop core has three secondary windings, two of which constitute blocking windings of an oscillator, the third being a source of unidirectional voltage pulses produced in the discriminating member due to the reversal of the core magnetism. A timing member constituted as a step-type counter of unidirectional pulses is connected to the source of unidirectional pulses of the discriminating member and an output member is connected to the output of the timing member.

---

The present invention relates to relay protective devices for electric power systems. More particularly the invention relates to protective devices for high-voltage D.C. power transmission lines, said device operating both upon the occurrence of short circuits and turnover of inverters (when the inverter becomes short circuited in the D.C. line).

The conventional protective device for D.C. power transmission lines made as under voltage protection with a current interlocking is known to comprise electromagnetic current and voltage relays constituting discriminating member, a time relay used as a timing member, and an auxiliary relay as the output member.

The disadvantages of the above device are its complicated construction and inconvenience in operation due to the fact that a great number of separate electromagnetic relays are involved.

The great number of relays causes unreliable operation of the protective device, considerable power consumption, and makes the size of the equipment too large. It is an object of the present invention to eliminate the above disadvantages.

It is another object of the present invention to provide a reliable noncontact protective device for D.C. power transmission lines which will operate both upon the occurrence of short circuits in the line and upon the turnover of inverters.

It is a still another object of the present invention to provide a small-size protective device for power transmission lines which will be simple in operation and have a low power consumption.

It is a still further object of the present invention to provide a protective device employing a simple high-stability timing member.

With the above and other objects in view, the present invention resides in a protective device for high-voltage D.C. power transmission lines incorporating a discriminating member constituted as a transformer with primary and secondary windings placed on a rectangular hysteresis loop core, one of the primary windings being connected through a ripple filter to a D.C. transformer, while the other primary winding is connected through a Zener diode, hereafter termed a stabilitron, and a choke to the voltage divider of the line being protected; with three secondary windings two of which are the blocking oscillator windings while the third winding is connected to the timing member and used to feed unidirectional voltage pulses to the input of the timing member, said pulses being set up in the discriminating member due to the reversal of the core magnetism and having a constant time-voltage integral.

Two stabilitrons with coupled like-polarity electrodes are connected in parallel to the filter which increases the sensitivity of the discriminating member.

To filter the input voltage from the variable component, a resonance filter is connected to the output of the discriminating member coupled to the voltage divider of the line being protected.

The timing member of the said protective device for power transmission lines is a step-type counter of unidirectional pulses employing a rectangular hysteresis loop core which accommodates windings one of which is connected to a nonlinear resistor composed, for example of two non-parallel diodes and a series-connected resistor.

The timing member is fitted with an automatic control element which is a transistor whose collector circuit connects one of the windings of the timing member transformer while the emitter and base are connected through the diode to the resistor of the discriminating member blocking oscillator.

Other objects of the invention and advantages thereof will be best understood from the following description and drawing which is a schematic diagram of the protective device for D.C. power transmission lines.

The device consists of noncontact discriminating member 1, noncontact pulse-operated timing member 2, and output member 3.

Discriminating member 1 employs toroidal magnetic core 4 having a rectangular hysteresis loop, which accommodates input windings 5 and 6, windings 7, 8, and output winding 9. The discriminating member comprises auxiliary current transformer 10 having primary winding 11 and secondary winding 12. Secondary winding 12 of auxiliary current transformer 10 is loaded with integrator 13 which serves to reduce the steepness of the secondary current front of auxiliary current transformer 10. The integrator consists of capacitors 14, 15, 16, resistors 17, 18, 19 and silicon stabilitrons 20, 21 (Zener diodes) connected in series opposition and used for limiting the secondary current of transformer 10. Input winding 5 of magnetic core 4 is, in turn, connected to the output of integrator 13.

The input voltage circuit of discriminating member 1 is set up on the principle of comparison and uses stabilitron 22 connected in series with winding 6 of magnetic core 4 and with choke 23 designed to decrease the current pulse load of magnetic core 4. The voltage setting of discriminating member 1 is adjusted by means of by-pass resistor 24 installed at the input. Installed at the input in parallel to resistor 24 is a resonance network consisting of series-connected capacitors 25 and choke 26, resonance-tuned to the medium frequency of 50 c.p.s. The said network is used to filter off the forced 50 c.p.s. component of the transmission line voltage. This component is built up when a two-phase turnover of inverters occurs (when the inverter becomes shortcircuited in the D.C. line).

Windings 7, 8 of magnetic core 4, capacitor 27, resistor 28, and transistor 29 using a common-emitter circuit comprise a blocking oscillator which serves as a regenerative element for the increase of the protective device sensitivity.

Diode 30 providing for unidirectional output pulses is connected in series with winding 9 of magnetic core 4, said winding being the output of discriminating member 1.

Timing member 2 is built on the basis of a conventional magnetic counter of unidirectional pulses. It consists of a counting element constituted by rectangular hysteresis loop magnetic core 31 which accommodates the following five windings: input winding 32, information reset winding 33, thermal compensation winding 34, correction winding 35, and output winding 36. Input winding 32 of magnetic core 31, output winding 9 of magnetic core 4, diode 30, and resistor 37 used for adjusting the time delay are series connected to form a coupling loop.

Information reset winding 33 is connected in series with limiting resistor 38 in the collector circuit of transistor 39 which operates as a switch and prepares magnetic core 31 for counting the pulses.

Transistor 39 is normally made conductive by the negative bias applied to its base through resistor 40. Transistor 39 is controlled by saw-tooth voltage taken off charging resistor 28 of the discriminating member and fed to the base of transistor 39 through diode 41 and resistor 42, smoothing capacitor 43 being inserted between the emitter of transistor 39 and diode 41.

Connected in series with thermal compensation winding 34 is diode 44 which controls direct current flowing through said winding 34 and compensating temperature error of timing member 2.

Winding 35 of magnetic core 31 is loaded with non-linear resistor 45 comprising resistor 46 and two series-connected non-parallel silicon diodes 47, 48, said non-linear resistor being used for stabilizing the output pulses of timing member 2.

Diode 49 which provides for unidirectional output pulses is connected in series with winding 36 of magnetic core 31, the latter being the output of timing member 2.

Output member 3 is designed to amplify and shape the pulses built up due to the operation of timing member 2. The output member is a one-shot multivibrator employing transistors 50, 51. Silicon diode 52 used for creating the required triggering threshold is connected into the emitter circuit of normally cut off transistor 51.

Transistor 50 with load resistor 53 inserted into the collector circuit thereof is normally made conductive by the negative bias voltage fed to its base through resistor 54. The collector of transistor 50 is connected to the base of transistor 51 through coupling resistor 55, while the collector of transistor 51 is connected to the base of transistor 50 through coupling capacitor 56.

Semiconductor diode 57 is connected in the non-conducting direction to the collector circuit of normally cut off transistor 51. Resistor 58 is connected in the supply circuit between timing member 2 and output member 3, and capacitor 59 is inserted between the positive and negative sides of the supply circuit on the output member end. Resistor 58 and capacitor 59 are used to preclude mutual effect of timing member 2 and output member 3 through the common supply source.

The multivibrator actuates either the noncontact circuit or the electromagnetic relay. Load 60 is connected to the multivibrator in parallel with semiconductor diode 57.

The protective device is connected to the power transmission line being protected through voltage divider 61 and D.C. transformer 62 installed at the beginning of the line.

The above described protective device operates as follows:

Under normal conditions of D.C. power transmission a certain portion of secondary alternating current of the auxiliary current transformer flows through winding 5 of magnetic core 4 of discriminating member 1. This current is proportional to that flowing in the power transmission line. Winding 6 now passes direct current which is proportional to the line voltage.

Due to the fact that the number of turns of windings 5, 6 and the level of limiting the secondary current of auxiliary current transformer 10 by stabilitrons 20, 21 are properly selected, magnetic core 4 is fully saturated under the normal operation of the power transmission system.

Hence, voltage pulses induced in the core windings have a rather low amplitude and do not affect the other parts of the device connected with core 4.

Upon occurrence of short circuit or turnover of inverters, the line voltage reduces to a residual value and the current of winding 6 fed from the voltage divider drops to zero due to the action of stabilitron 22.

The secondary current of auxiliary current transformer 10 is maintained almost constant by means of a current regulator provided in the D.C. transmission line rectifier, and the amplitude of A.C. voltage in winding 5 of magnetic core 4, which is limited by the silicon diodes, remains constant. Due to the proper selection of the R.M.S. value of ampereturns in winding 5, the reduction of current in winding 6 of magnetic core 4 to zero causes a cyclic reversal of the polarity of core 4.

The amplitude of pulses induced due to this cyclic reversal of the polarity of core 4 is sufficient for triggering the blocking oscillator using transistor 29. While the positive half-cycle current passes through winding 5 of magnetic core 4, the pulse voltage built up across winding 7 of the blocking oscillator provides for the initial opening of transistor 29. Then the close positive feedback existing between the collector and base circuits of transistor 29 brings about a cumulative rise of the collector current.

Under the effect of this collector current flowing through winding 8, magnetic core 4 becomes saturated in the reverse direction.

After the polarity of core 4 has reversed, transistor 29 is cut off again.

While the polarity of magnetic core 4 is being reversed, a voltage pulse appears across the discriminating member output comprised by winding 9 and diode 30.

At the instant the current of winding 5 reaches zero, core 4 is in the predetermined condition characterized by the maximum positive value of residual magnetic induction. Then, under the effect of the negative half-cycle current flowing through winding 5, magnetic core 4 will regain its initial condition characterized by the maximum negative value of residual induction.

In the event of the persistent fault in the power transmission line, the above process of reversing the polarity of core 4 will be continuously repeated with the frequency of the secondary current of auxiliary current transformer 10, i.e. the commercial frequency of 50 c.p.s.

Thus, the operation of discriminating member 1 of the protective device will be characterized in that voltage pulses built up across its output will alternate at a frequency of 50 c.p.s., i.e. every 0.02 sec., and have a constant volt-second integral determined by the area of the hysteresis loop at the maximum cyclic state of magnetic core 4.

The pulses having a constant volt-second integral and taken off the second winding 9 of magnetic core 4 are fed through diode 30 and setting resistor 37 to the input of timing member 2 constituted by winding 32 of magnetic core 31.

As these unidirectional pulses are being fed to winding 32, a gradual cyclic magnetization of core 31 takes place until the core gets saturated. Saturation of core 31 is obtained after a certain number of pulses predetermined by setting resistor 37 are applied, i.e. after the predetermined time equal to the product of the number of pulses by the time interval between them (approximately 0.02 sec.).

The end of the preset time delay counting and the moment of operation of timing member 2, which takes place as soon as magnetic core 31 becomes saturated, are determined by the rise of the reverse voltage pulses (self-induction pulses) induced in the windings of core 31 while the input pulses are decaying.

Information reset winding 33 usually carrying direct current is employed for discharging the information stored in magnetic core 31 by the time the fault on the line has been eliminated and the timing member has been reset to its initial condition. The direct current flowing through winding 33 is controlled by transistor 39 operating as a switch and, in its turn, controlled by saw-tooth voltage supplied from charging resistor 28. The reset of information and the timing member takes place within a short interval after the reset of the discriminating member. Transistor 39 is cut off to prepare the timing member for counting the pulses just at the instant the first pulse of the discriminating member is produced.

The time delay can be adjusted within 0.08–0.5 sec. by means of variable resistor 37. To accurately determine the instant of saturation of magnetic core 31 within the entire range of time delay settings, winding 31 is loaded with a nonlinear resistor composed of two non-parallel-connected silicon diodes 47, 48 and resistor 46. The nonlinearity of the straight portions of the volt-ampere curves of diodes 47, 48 and the possibility of their correction by means of resistor 46 make it possible to maintain the amplitudes of the reverse voltage pulses practically at the same level when counting different time delays and to obtain the required rate of rise of these pulses when the core is saturated.

The temperature errors of the timing member determined by the dependence of the uncontrolled collector current of transistor 39 on the ambient temperature, are compensated by direct current flowing through winding 34 of magnetic core 31 and controlled by the reverse resistance of diode 44.

Output member 3 used for amplifying the information pulses from the timing member and converting them into D.C. voltage is triggered after the operation of timing member 2 under the effect of the first amplified pulse of reverse negative voltage (self-induction pulse) taken off winding 36 (timing member output) and applied to the base of normally cut off transistor 50 through diode 49.

Since the reverse voltage pulses induced in the windings of magnetic core 31 are maintained at the same level within the entire range of time delay settings, a one-shot multivibrator with an uncontrolled trigger threshold can be used as output member 3. The trigger operating threshold is determined by the cut-off bias voltage due to the voltage drop across the resistor of silicon diode 52 developed when it passes uncontrolled collector current of normally cut off transistor 51.

This output member can operate in conjunction with both a noncontact system and a standard electromechanical actuating relay. Load 60 is connected to the collector of transistor 51 in parallel to semiconductor diode 57.

When an electromechanical relay is used as a load, it operates but does not drop out within the intervals between pulses and is held in the attracted condition until discriminating member 1 of the protective device is reset to its initial state.

The protective device is supplied with stabilized D.C. voltage of 20 v.

While the invention has been described as embodied in a particular device, it will be readily understood by those skilled in the art that various modifications and changes may be made without departing in any way from the concept and scope of the invention.

These modifications and changes are to be comprehended within the meaning and range of equivalence of the following claims.

What is claimed is:

1. A protective device for high-voltage D.C. power transmission lines comprising a discriminating member including a transformer having primary and secondary windings, a rectangular hysteresis loop core having two primary windings one of which is connected to said transformer, the other being connected to a voltage divider of the line being protected, and three secondary windings of which two constitute blocking windings of an oscillator, the third being a source of unidirectional voltage pulses produced in the said discriminating member due to the reversal of the core magnetism, a timing member constituted as a step-type counter of unidirectional pulses connected to said source of unidirectional pulses of the said discriminating member; and an output member connected to the output of said timing member.

2. A protective device as claimed in claim 1 comprising a ripple filter and two stabilitrons connected between said transformer and said one primary winding, and a resonance tuned filter connected between the voltage divider and the other primary winding.

3. A protective device as claimed in claim 2, wherein said stabilitrons are connected together in opposition in parallel with said ripple filter, said timing member including a rectangular hysteresis loop magnetic core and three windings, one being connected to said source of unidirectional voltage pulses, a non-linear resistor comprising two non-parallel diodes and a series connected resistor connected to a second of the three windings, the third winding constituting said output which is connected to said output member.

4. A protective device as claimed in claim 3 comprising an automatic control facility for the said timing member including a transistor having a collector connected to one of the windings of the said timing member, a diode, a resistor for the blocking oscillator of said discriminatory member, the emitter and base of the said transistor being connected through said diode to the resistor of said blocking oscillator.

5. A protective device as claimed in claim 4, wherein said output member is constituted as a one-shot multivibrator with transistors.

References Cited

UNITED STATES PATENTS

| | | | |
|---|---|---|---|
| 2,849,662 | 8/1958 | Britten | 317—36 X |
| 2,895,084 | 7/1959 | Siedband | 317—36 X |
| 3,018,361 | 1/1962 | Rebuffoni | 317—36 X |

JOHN F. COUCH, *Primary Examiner.*

R. V. LUPO, *Assistant Examiner.*

U.S. Cl. X.R.

317—14, 53